Aug. 27, 1968   R. H. BEAUMONT ETAL   3,399,111
SUPPLEMENTAL BELT IN COMBINATION WITH AN ENDLESS BELT IN
PAPERMAKING AND METHOD OF INSTALLING THE
SUPPLEMENTAL BELT

Filed Dec. 1, 1966   4 Sheets-Sheet 1

United States Patent Office 3,399,111
Patented Aug. 27, 1968

3,399,111
SUPPLEMENTAL BELT IN COMBINATION WITH AN ENDLESS BELT IN PAPERMAKING AND METHOD OF INSTALLING THE SUPPLEMENTAL BELT
Ralph H. Beaumont, Greensboro, N.C., and Donald R. Christie, Troy, John Okrepkie, Watervliet, and Dan B. Wicker, Loudonville, N.Y., assignors to Huyck Corporation, Rensselaer, N.Y., a corporation of New York
Continuation-in-part of applications Ser. No. 283,828, May 28, 1963 and Ser. No. 316,350, Oct. 16, 1963. This application Dec. 1, 1966, Ser. No. 610,721
9 Claims. (Cl. 162—199)

ABSTRACT OF THE DISCLOSURE

This invention relates to papermaking and more particularly to a supplemental belt for use in conjunction with a web carrying belt in a paper machine, and to a method of producing and installing such supplemental belt on the machine. The supplemental belts disclosed herein as illustrative embodiments of the invention are fabricated from perforated polyethylene terephthalate film or other polymeric sheet material and are arranged to move in an endless path inside a Fourdrinier screen or a papermakers' wet felt to facilitate the removal of moisture therefrom. The ends of the supplemental belt are joined through the use of ultrasonic techniques, preferably after the belt has been positioned along its endless path, and one or both surfaces of the belt is modified to increase its resistance to slippage. In some cases the modifications comprise channels or protuberances on the surface of the belt, while in other embodiments a woven textile fabric, an open cell foam or a nonwoven fibrous batt is laminated to the surface to provide the modifications.

Cross-references to related applications

This application is a continuation-in-part of copending application Ser. No. 283,828 filed May 28, 1963, and copending application Ser. No. 316,350 filed Oct. 16, 1963. These copending applications have been permitted to become abandoned in favor of the present case.

Background of the invention

As is well known in the papermaking field, in Fourdrinier and other papermaking machines of the type employing an endless forming belt of screen-like material a fibrous suspension of water-saturated pulp is continually deposited on the belt from a suitable orifice at the wet end of the machine. As used herein, the terms "papermaking," "paper," etc., refer to the manufacture of conventional paper products and also to other, related products such as paperboard, boxboard, asbestos-cement, and other products having a non-woven fibrous structure. The endless belt customarily is fabricated from woven metal wire or synthetic yarns of open screen construction and is referred to herein as a Fourdrinier screen. The Fourdrinier screen ordinarily is supported between a breast roller adjacent the supply of pulp and a remotely located driving or couch roll. The path of the screen as it moves from the breast roll to the couch roll is generally horizontal, and the screen passes over one or more forming boards, table rolls and other drainage units which enable the controlled drainage through the screen of a major part of the moisture in the fibrous suspension. The screen then moves over a plurality of suction boxes or other moisture-removing means which extract additional moisture from the fibrous web. Upon reaching the couch roll, further suction is applied and is then released so that the web may be removed from the screen and continuously conveyed to the subsequent pressing operation by a running papermakers' felt. Although particularly during the initial portion of its travel between the breast and couch rolls the fibers on the screen more closely resemble a suspension than a compact web, to facilitate the description the term "web" is used herein to denote the layer of fibers or other papermaking material irrespective of its position in the machine.

At the time the fibrous web leaves the couch roll, its moisture content typically ranges from about eighty percent to about ninety percent, wet basis. The structure of the web in this condition consists of interlaced or felted fibers having voids therebetween which are not entirely filled with moisture. As a result, the removal of additional moisture by applying further suction no longer is satisfactory from a practical standpoint. Accordingly, the running papermakers' felt transfers the web from the couch roll to an endless belt, customarily in the form of a relatively thick and absorbent papermakers' felt, which carries the web through the press or "wet" section of the machine. The felt transports the web through one or more pairs of opposed press rolls until the web's moisture content is reduced to a satisfactory level. Each pair of press rolls squeezes the web to temporarily reduce its thickness, thus reducing the total volume of voids within the web's structure below the volume of the moisture carried thereby. This squeezing action expresses moisture from the web into the supporting felt. The web is then led through one or more drying sections of the machine to remove the remaining moisture.

To reduce the amount of wear of the suction boxes or other moisture-removing devices as the Fourdrinier screen moves along their upper surfaces in the forming section of the machine, there have been developed various woven or otherwise deformable supplemental belts which are arranged inside the endless path of the screen between the screen and the suction boxes. One such belt is disclosed in Charles A. Lee U.S. Patent 3,222,246, granted Dec. 7, 1965. Similarily, in the press section of the machine supplemental belts have been employed in an effort to reduce the moisture content of the web transporting felt. Certain types of supplemental belts for this latter purpose comprise an endless deformable mat which is arranged to run inside the felt and is provided with voids to enable the receipt of moisture as the felt and mat pass through and beyond the nip region between the press rolls. A particularly good arrangement employing a mat of this type is disclosed, for example, in Dan B. Wicker et al. U.S. Patent 3,214,330, granted Oct. 20, 1965.

Heretofore, supplemental belts of the foregoing type have exhibited certain disadvantages. As an illustration, in many cases the belts were ineffective to provide the desired moisture removing action. With supplemental belts of woven construction, for example, compromises were necessary between the provision of a belt having a comparatively open weave, to enable the realization of optimum drainage characteristics, and a belt in which the yarns were sufficiently close together to give high strength and durability. The strength and durability of the belt are particularly important in the forming section of the machine, but these characteristics also must be taken into account in the press section. Another disadvantage of prior supplemental belts which became manifest when the belt was used with a web carrying papermakers' felt was that the moisture absorbed by the belt tended to rewet the felt and thus detracted from its moisture removing capabilities. In addition, particularly when the supplemental belts employed heretofore were fabricated from rubber or other material deformable in thickness, difficulties were encountered in joining the ends of the belt to form an endless construction and in installing the belt inside the web carrying belt on the machine. Furthermore, the deformable characteristics of the belts previously employed, along with the arrangement of voids in the belt structure, frequently resulted in the accumulation of loose fibers in the voids from the web and necessitated frequent cleaning to enable the realization of the belt's optimum moisture-removing characteristics. Still another difficulty encountered heretofore was the problem of providing a material for the supplemental belt which was sufficiently smooth to avoid excessive drag as the belt passed over the suction boxes or other components of the machine and yet was sufficiently rough to avoid slippage between the belt and the web carrying belt. These and other disadvantages, particularly when considered in the light of the comparatively high cost of prior supplemental belts, have seriously restricted the use of such belts for many applications.

Summary

One general object of this invention is to provide a new and improved supplemental belt for use in conjunction with a web carrying belt in a paper machine.

Another general object of the invention is to provide a novel method for forming such belt and for installing the belt on the machine.

More specifically, it is an object of this invention to provide a belt and method of the character indicated in which the belt exhibits extremely good drainage and moisture-removing characteristics and has greater strength and durability than the supplemental belts heretofore available.

Another object of this invention is to provide a supplemental belt in which the possibilities of slippage between the belt and the web carrying belt are substantially reduced.

A further object of the invention is to provide such belt wherein the frictional resistance to movement of the belt is considerably lower than that of the supplemental belts employed heretofore.

Still another object of the invention is to provide a belt which is extremely economical to manufacture and thoroughly reliable in operation.

In one illustrative embodiment of the invention, there is provided a supplemental belt which is positioned inside a web carrying belt on a paper machine and is manufactured from an oblong sheet of synthetic, non-woven material. The sheet is provided with a plurality of perforations substantially entirely throughout its surface area. The ends of the sheet are connected together by unique sealing means to provide an endless construction, and the thus formed belt is arranged in an operative position on the machine.

In accordance with one feature of the invention, the supplemental belt is manufactured from one or more sheets of polymeric material having a substantially crystalline structure, for example, polyethylene terephthalate. The material is substantially nondeformable in thickness, even when subjected to comparatively high stress, and is extremely effective in reducing the incidence of wet streaks which might otherwise occur on the paper product. The material is characterized by its high tensile strength, flexibility and dimensional stability and also by its exceedingly smooth surface characteristics. These properties are particularly important under the conditions of tension, abrasion, flexure, etc., encountered in the forming and press sections of the machine. The perforation arrangement preferably is such that uninterrupted paths of the material extend in a lengthwise or machine direction, thereby further preserving the belt's tensile strength and durability.

In accordance with still another feature of the invention, in several good arrangements, the belt is provided with a scored or undulating surface which conforms to a unique and uniform pattern. As a result, the frictional and drainage characteristics of the belt are properly controlled.

In accordance with a further feature of the invention, in several advantageous embodiments, the side of the supplemental belt adjacent the web carrying belt includes a laminated layer of deformable, compressible material which has a porosity less than that of the nondeformable polymeric sheet material. The lamination serves as a barrier which substantially reduces any possibility of moisture being transmitted back to the web carrying belt from the perforations in the supplemental belt.

In accordance with a still further feature of certain embodiments of the invention, one or both sides of the supplemental belt is provided with a slippage-resistant surface which produces a comparatively high coefficient of friction between the belt and the surface in contact therewith. In one arrangement the supplemental belt is coated with an abrasive, while in other embodiments a laminated layer, scoring, etc., provides the high coefficient of friction. In cases in which the outer surface of the supplemental belt is thus modified, the possibility of slippage between the belt and the web carrying belt is substantially reduced. Similarly, for supplemental belts having a modified inner surface, the arrangement is such that any slippage between the belt and its driving and supporting rolls is maintained at a minimum.

In accordance with a further feature of the invention, in some embodiments, the ends of the supplemental belt are connected by ultrasonic means. For compratively wide paper machines, the belt also is provided with one or more additional ultrasonic seals which extend in a longitudinal direction between pairs of sheets of polymeric material in side-by-side relationship with each other. Such seals provide an extremely strong joint without substantially affecting the drainage characteristics of the material.

Brief description of the drawings

The present invention, as well as further objects and features thereof, will be understood more clearly and fully from the following description of certain preferred embodiments, when read with reference to the accompanying drawings, in which.

Description of certain preferred embodiments

In describing the various embodiments of the invention illustrated in the drawings, there will first be given a description of the forming section of a representative paper machine, together with various illustrative supplemental belts in accordance with the invention for use in the forming section. There will then be described an illustrative supplemental belt in accordance with the invention for use in the press section of the machine.

Figure 1:
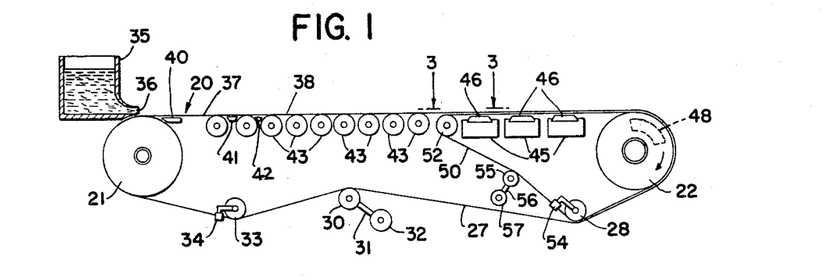
FIGURE 1 is a diagrammatic side elevational view of the forming section of a papermaking machine including a supplemental belt in accordance with one illustrative embodiment of the invention.
Figure 2:
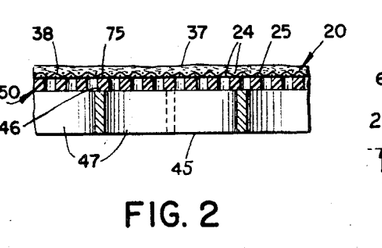
FIGURE 2 is an enlarged fragmentary sectional view of a portion of the forming section, taken along the line 2—2 in FIGURE 3.
Figure 3:
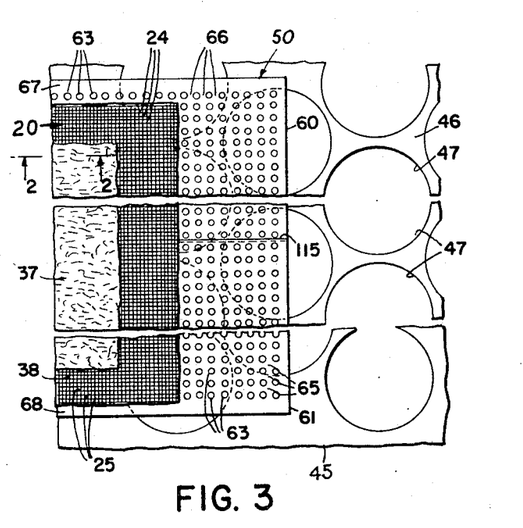
FIGURE 3 is an enlarged fragmentary plan view as seen from the line 3—3 in FIGURE 1.

Referring to FIGURES 1–3 of the drawings, there is shown the forming section of a paper machine which includes a web carrying belt in the form of a Fourdrinier screen indicated generally at 20. The screen 20 is movable in an endless path between a breast roll 21 and a couch roll 22 and is made up in the usual manner from transversely extending wires or yarns 24 and longitudinally extending wires or yarns 25. Although the screen has been indicated as being of plain weave, it will be understood that any of the various weaves heretofore used for Fourdrinier screens may be employed as the screen 20. The screen customarily is manufactured either from bronze or other metallic wire, with welded or brazed joints to form an endless construction, or from synthetic yarns which in most cases are woven endless to avoid the need for a joint or seam.

In the usual Fourdrinier machine, the screen 20 is continuously driven by the couch roll 22 in a clockwise direction, as viewed in FIGURE 1. The screen includes a lower reach 27 which extends from the couch roll past a roll 28 of well-known construction. The tension in the screen is controlled by a tensioning roll 30 which is supported in a conventional manner on an arm 31 secured to a pivotally movable shaft 32. As it approaches the breast roll 21, the lower reach of the screen moves past a screen guide roll 33 having the usual edge sensing paddles 34 for automatic operation.

Immediately above the breast roll 21 is a head box 35 having a horizontally extending orifice or "slice" 36. The paper stock is discharged from this orifice in the form of an aqueous suspension of fibers 37 and flows continuously in a ribbon-like stream, frequently several inches deep, onto the upper reach 38 of the screen 20. The upper reach 38 passes over a forming board 40 and one or more additional boards or deflector foils 41 and 42 which are positioned immediately beneath the screen adjacent the breast roll. The forming board 40 is effective to partially impede the drainage of water through the screen for a brief period, during which time the formation of the web begins with generally horizontal fibers bridging the interstices of the screen. The boards or foils 41 and 42 customarily are inclined downwardly and forwardly to facilitate drainage after the initiation of the forming process.

The upper reach 38 of the screen 20 moves over a series of table rolls 43 which are rotatably mounted on horizontal axes extending in directions perpendicular to the path of the screen. As is well known, the rolls 43 serve to support the reach 38 with the fibers 37 thereon and also to facilitate the removal of water through the screen. Thus, as the screen passes over each table roll, the cylindrical surface of the roll moves downwardly away from the screen to create a zone of sub-atmospheric pressure which tends to draw water downwardly through the screen.

After leaving the table rolls 43, the upper reach 38 of the screen 20 passes over one or more suction boxes 45. These boxes include substantially flat tops 46 having a series of perforations therein which illustratively are in the form of circular openings 47. The openings 47 customarily are arranged in transverse rows and are staggered from row to row. The boxes 45 are connected to a suitable vaccum pump (not shown) which exhausts the air and water from the interior of the boxes entering through the screen and the openings 47.

After the Fourdrinier screen 20 leaves the suction boxes 45, it passes around the couch roll 22. The roll 22 includes the usual suction chamber 48 therein which remains stationary and communicates with the inner surface of the screen 20 through a series of perforations (not visible in the drawings) in the cylindrical surface of the roll. The chamber 48 is continuously exhausted to withdraw additional moisture from the fibrous stock 37 on the screen.

The structure described thus far is merely illustrative of a conventional combination of paper machine components. It will be readily apparent that in any such combination the Fourdrinier screen 20 must have high tensile strength to withstand the longitudinal forces resulting from the tension in the screen and from the transmission of power thereto from the couch roll. The screen also must have good abrasion resistance because of its contact with the various rolls and stationary surfaces along its path.

In the embodiment illustrated in FIGURES 1–3, there is provided a supplemental belt 50 which enables a reduction in the power needed to drive the Fourdrinier screen 20 and also reduces frictional drag with the attendant reduction in abrasive wear. The supplemental belt 50 is of endless construction and is arranged inside the screen 20 so that it moves in contact with the screen over a portion of its endless path. The belt 50 extends from a roll 52 adjacent and parallel to the table rolls 43, then over the suction boxes 45 between the tops 46 and the screen and then around the couch roll 22 to the roll 28. At this latter roll, the belt separates from the screen and is engaged by edge sensing paddles 54, the 28 serving to guide both the screen and the belt in response to the paddles 54. A tensioning roll 55 engages the belt 50 as it moves between the roll 28 and the roll 52 to adjust the tension in the belt. The roll 55 is carried by an arm 56 affixed to a pivotally mounted shaft 57.

The supplemental belt 50 is fabricated from a thermoplastic polymeric sheet material having a substantially crystalline structure. The belt material exhibits little or no compressibility and is comparatively light in weight and highly flexible. In addition, the material advantageously is substantially impervious to moisture and is characterized by an extremely smooth surface finish, when compared to woven supplemental belts of the type employed heretofore.

One illustration of an incompressible polymeric sheet material which is of particular utility for use as a supplemental belt is polyethylene terephthalate. This material is exemplified by the line of products commercially available from E. I. du Pont de Nemours & Company, Wilmington, Del., and sold under its trademark Mylar. Such products are referred to herein as Mylar polyester film and are characterized by their crystalline structure, extremely smooth surface finish and high tensile strength. The distortion point of the material customarily lies within the range of from about 380° F. to 490 F. Because conventional adhesives, heat-sealing operations, etc., have little utility when applied to Mylar polyester film, difficulties heretofore were encountered in joining the ends of the material to form an endless belt, particularly in cases in which the belt was subjected to high stress. However, because of the unique jointing means described hereinafter, the ends of the belt are firmly interconnected to provide an endless construction.

Of the various types of Mylar polyester film presently available, Tyle T is particularly useful for supplemental belts in the forming section of a paper machine, whereas either Tyle T or Type A may be advantageously employed in the press section of the machine. Type A is biaxially oriented, having substantially equal properties in both the longitudinal or machine direction and in the transverse or cross direction. Type T has unussually high tensile strength in the machine direction and is of particular utility in cases in which the machine is operated at high speed or in the manufacture of some of the heavier paper products such as paperboard, for example.

Other polymeric materials useful in the formation of supplemental belts in accordance with the invention include polyamide polymers, e.g., the nylons designated as Type 6, Type 66 and HT-1, various polycarbonate polymers, polyolefin polymers such as polyethylene and polypropylene, for example, polyvinyl fluoride or other vinylpolymers, and various varieties of vinylidene polymers. Representative of suitable polymers of this latter class are polymers of vinylidene bromide, vinylidene chlorobromide, vinylidene cyanide and vinylidene halocyanide. These and other monomers also may be co-polymerized to form copolymers such as vinylidene chloride-vinyl chloride, for example.

As best shown in FIGURE 3, the supplemental belt 50 is fabricated from two oblong, rectangular sheets 60 and 61 of Mylar polyester film. These sheets are ultrasonically sealed in side-by-side relationship with each other, in a manner that will become more fully apparent hereinafter, to provide smooth continuous belt surfaces. The sheets 60 and 61 each include a series of perforations 63 which extend substantially entirely throughout the same. These perforations are aligned in rows which extend in the longitudinal or machine direction of the belt and also in the transverse or cross direction. The spacing between adjacent rows of perforations is substantially equal to the diameter of each perforation and provides uninterrupted longitudinal paths 65 and transverse paths 66 of the belt material. Particularly because of the longitudinal paths 65, the reduction in tensile strength of the material occasioned by the perforations is considerably less than would otherwise be the case. The outer edges of the sheets 60 and 61 include longitudinally extending imperforate areas 67 and 68, respectively. These areas serve to minimize the possibility of fraying or rupture as the belt moves around the couch roll 22 and the additional rolls 28, 55 and 52.

Primarily as a result of the perforations 63, supplemental belts in accordance with the various illustrated embodiments of the invention exhibit considerably improved drainage characteristics over various types of woven belts heretofore available. In the embodiment shown in FIGURES 1-3, each of the perforations 63 has a diameter which illustratively is of the order of .045 inch, and 225 perforations are provided in each square inch of the material, giving an open area of thirty-six percent. With this arrangement, the air permeability of the belt is over 700 cubic feet per minute per square foot at 0.5 inch water, as measured under ASTM Standard Test Procedure No. D737-46 for Air Permeability of Textiles. In other advantageous embodiments, the size and orientation of the perforations varies widely in accordance with the type of paper machine and the particular portion of the machine in which the belt is employed. For supplemental belts which are used in the forming or press sections of the machine, for example, the perforations preferably are such that the belts have an open area within the range of from about 10 percent to about 50 percent, with the forming section belts having comparatively large perforations to give an open area which lies in the upper portion of this range. As an illustration, for many applications the diameter of each of the perforations in the forming section belts should be at least about .030 inch. In cases in which the belts are used in the press section, on the other hand, somewhat smaller perforations advantageously may be employed, for purposes that will become more fully apparent hereinafter.

Figures 6, 7, 8, 9, 20, 21:
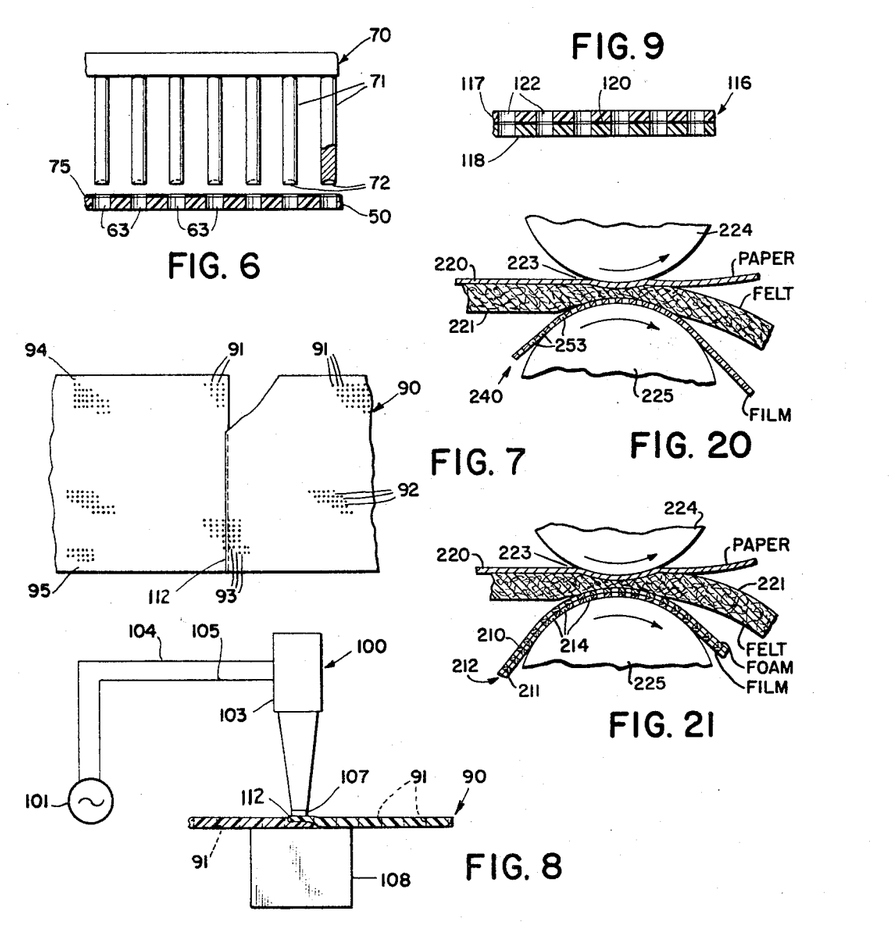
FIGURE 6 is an enlarged vertical sectional view of the belt shown in FIGURE 1, together with a schematic representation of suitable perforating apparatus.
FIGURE 7 is a plan view, partially broken away, of the ends of a supplemental belt showing a representative connection therebetween.
FIGURE 8 is an enlarged vertical sectional view of a portion of the belt shown in FIGURE 7, along with a schematic illustration of representative apparatus for affecting various seals.
FIGURE 9 is an enlarged vertical sectional view of a portion of a supplemental belt in accordance with another illustrative embodiment of the invention.
FIGURE 20 is a fragmentary vertical sectional view showing the belt of FIGURE 18 in position on the machine.
FIGURE 21 is a fragmentary vertical sectional view in general similar to FIGURE 20 but showing the supplemental belt of FIGURE 15 in position in the press section of the machine.

The perforations are formed by punching apparatus indicated schematically at 70 (FIGURE 6). The apparatus 70 includes a series of cylindrical, downwardly extending punches 71 which are movable in directions perpendicular to the plane of the polymeric sheet material forming the belt. The lower surfaces of the punches 71 are recessed to form comparatively sharp cutting edges 72. Upon movement of the punches into the sheet of material, the material is cut away to form the perforations. In most cases, the punches are at a temperature which is well below the softening point of the material, and preferably at substantially room temperature. With this arrangement, the material to be removed from the sheet is cut cleanly, thus substantially eliminating the possibility of forming small lumps or beads of material on the sheet surfaces which might mar the paper web.

In the embodiment of FIGURES 1-3, the perforations 63 advantageously are formed after the sheets 60 and 61 have been sealed in side-by-side relationship with each other. The perforations extend across the seal without interruption and are arranged substantially entirely throughout each sheet. In other good arrangements, the sheets are perforated before the sealing operation. The perforations either terminate prior to the inside edges of the sheets, to provide imperforate, longitudinally extending areas of material adjacent each seal, or extend in close proximity therewith.

Upon the formation of the perforations in the belt material, the material preferably is pre-conditioned by the application of heat to reduce the possibility of shrinkage during the papermaking operation and also to relieve any stresses that may have developed during the formation of the perforations. The ends of the material are first temporarily connected, as by suitable staples (not shown), and the belt is then installed under tension around a portion of the cylindrical surface of one or more heated drums (not shown) with are maintained at a predetermined temperature. In certain good arrangements, the belt is pre-conditioned at a temperature of about 300° F. and is maintained at that temperature for a length of time sufficient to substantially eliminate the possibility of any residual shrinkage on the paper machine. In most cases, the pre-conditioning time is relatively short and illustratively is of the order of about five minutes. Thereafter, the staples are removed, and the belt is cut to the appropriate length preparatory to its installation on the machine.

In other embodiments, the possibility of substantial belt shrinkage on the machine is so slight that the pre-conditioning step is eliminated.

To reduce the possibility of slippage between the supplemental belt 50 and the Fourdrinier screen 20, the outer surface of the belt is provided with a layer 75 of material which produces a high coefficient of friction between the belt and the screen. The layer 75 illustratively comprises a coating of colloidal silica which is applied to the belt surface and permitted to dry. One commercially available product of this type is Syton DS, a trade name of the Monsanto Chemical Company, St. Louis, Mo. As another illustration of a suitable coating layer 75, an abrasive material such as ground silica, for example, may be applied to the outer surface of the belt. The abrasive may be held in place by heating the belt to a temperature above its softening point, thus using its thermoplastic properties, or by curing with various thermosetting resins.

In operation, the driving power from the couch roll 22 is transmitted to the supplemental belt 50, and the belt in turn drives the Fourdrinier screen 20. Both the belt 50 and the screen 20 move in a clockwise direction, as viewed in FIGURE 1, and the fibrous stock 37 from the head box 35 is advanced over the various moisture-removing devices 41, 43, 45 and 48 to form the paper web. The outer surface of the portion of the belt which extends from the roll 52 around the couch roll 22 to the guide roll 28 at all times is in facing contact with the inner surface of the corresponding portion of the screen 20. Similarly, the portion of the inner belt surface above the suction boxes 45 at all times is in facing contact with the tops 46 of these boxes.

The interpositioning of the belt 50 between the screen 20 and the suction box tops 46 results in a substantial reduction in the driving power which must be transmitted through the screen. Because of the extremely smooth inside surface of the belt 50, abrasive wear between the belt and the suction box tops is maintained at a minimum. This characteristic may be used to its fullest advantage by employing box tops which are highly resistant to abrasion and preferably are smoothly polished. As an illustration, the tops 46 may be manufactured of stainless steel, for example, rather than the wood or synthetic materials customarily used heretofore, and their upper surfaces may be polished prior to installation. As the belt 50 moves across the box tops, further polishing takes place, but any deleterious grooving or galling of the upper surfaces is eliminated. The coefficient of friction between the inner surface of the belt and the box tops is extremely low. As a result, the force required to pull the screen and the fibrous material thereon across the box tops is substantially lower than that needed in prior machines.

The wood or synthetic suction box tops used heretofore were employed because of the need for a material having a lower resistance to abrasion than that of the Fourdrinier screen. Steel or other comparatively hard materials were generally considered to be impractical because of the resulting abrasive wear of the screen. Because of the unique characteristics of the incompressible and nondeformable polymeric sheet material comprising the belt 50, however, hard steel suction box tops may now be employed with a metallic screen. The material also has the advantages of increased service life, reduced power demand and substantially complete elimination of the necessity for resurfacing the box tops.

By arranging the supplemental belt 50 around the couch roll 22 and thus using it for power transmission, the Fourdrinier screen 20 is relieved from a substantial portion of the longitudinal stress incident to the driving of the screen by the roll. Among its other advantages, the screen may be of considerably lighter construction than the screens customarily employed heretofore.

The nondeformable characteristics of the material comprising the supplemental belt 50, in addition to their other advantages, greatly reduce the possibility of wet streaks in the paper web being formed. In various prior arrangements, these streaks occasionally appeared as the path of the belt diverged from that of the fibrous web and resulted in part from moisture absorbed by the belt material which was transmitted back through the screen to the web. The polymeric sheet material forming the belt 50, however, is substantially non-absorbent, with the result that any moisture transmitted back to the web is maintained at a minimum.

Figure 4:
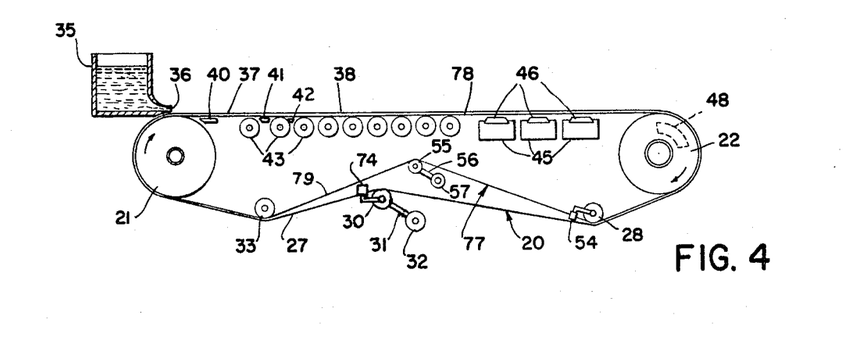
FIGURE 4 is a view in general similar to FIGURE 1 but showing another arrangement of the supplemental belt in the forming section of the machine.

Referring to FIGURE 4, there is shown the forming section of a paper machine which includes a supplemental belt 77. The principal components of the forming section illustrated in FIGURE 1 are also shown in FIGURE 4 and are indicated by the same reference characters to avoid the necessity for repeating the description of such components. The belt 77 is fabricated from Mylar polyester film in a manner similar to the belt 50 described above and includes a series of perforations (not visible in FIGURE 4) of a size and orientation substantially the same as the perforations 63 (FIGURE 3) in the belt 50.

In the FIGURE 4 arrangement, the belt 77 is positioned inside the Fourdrinier screen 20 and is substantially coextensive therewith throughout almost its entire path. The upper reach 78 of the belt 77 is in facing contact with the upper reach 38 of the screen 20 and is interposed between the screen and the boards 40, 41 and 42, the table rolls 43 and the suction boxes 45. The belt is disposed around both the breast roll 21 and the couch roll 22, and its lower reach 79 extends over the return roll 28, the tensioning roll 55 and the return roll 33. At the return roll 28, the screen is guided away from the belt to pass over the screen tensioning roll 30. This tensioning roll is provided with edge sensing paddles 74. The screen rejoins the belt as it approaches the return roll 33.

The tensioning rolls 30 and 55 are adjusted so that both the Fourdrinier screen 20 and the supplemental belt 77 ride together smoothly with the belt 77 assuming almost all of the stresses and wear to which the screen would otherwise be subjected. With this arrangement, the designer of the screen is almost unlimited in his ability to take advantage of light, delicate fabrics including several which ordinarily could not be used alone as Fourdrinier screens.

Figure 5:
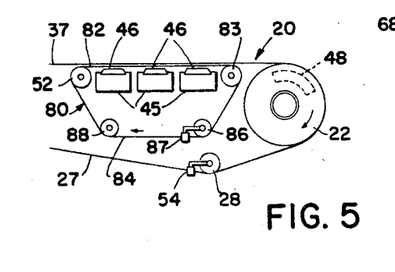
FIGURE 5 is a view in general similar to a portion of FIGURE 1 but showing still another arrangement of the belt in the forming section.

In FIGURE 5, there is shown a portion of a paper machine which is generally of the type described heretofore but which includes a perforated supplemental belt in the form of an idler belt 80. The upper reach 82 of the belt 80 is positioned between the Fourdrinier screen 20 and the suction box tops 46 and extends from the roll 52 to a second roll 83 on the side of the suction boxes adjacent the couch roll 22. The lower reach 84 of the belt 80 returns to the roll 52 around a guide roll 86 having edge sensing paddles 87 and a second guide roll 88. The edge sensing paddles 54 of the guide roll 28 are arranged to facilitate the guiding of the belt.

Although the idler belt 80 does not serve as a direct power transmitting means between the couch roll 22 and the Fourdrinier screen 20, the power demand on the couch roll is considerably less because of the incompressible characteristics and smooth inside surface of the belt. The frictional resistance to the movement of the screen over the suction box tops 46 is substantially lower than would otherwise be the case. In addition, the belt 80 receives much of the abrasive wear that the tops 46 would otherwise impose on the screen. The belt is light in weight and is easily driven by the screen.

For paper machines of comparatively small size in which the paper web being produced is relatively narrow, a single sheet of incompressible polymeric material is employed rather than the two sheets 60 and 61 (FIGURE 3). Thus, as best shown in FIGURE 7, there is provided a supplemental belt 90 of Mylar polyester film which includes perforations 91 substantially entirely throughout the same. These perforations are arranged in a manner similar to the perforations in the supplemental belts 50, 77 and 80 described heretofore. The belt 90 includes uninterrupted lengthwise paths 92 and transverse paths 93 between the adjacent rows of perforations, and the longitudinal edges of the belt form longitudinally extending imperforate areas 94 and 95.

As best shown in FIGURE 8, the opposite ends of the supplemental belt 90 are interconnected by ultrasonic welding apparatus indicated generally at 100. The apparatus 100 includes a sine wave voltage source 101 which is connected to a transducer 103 by two conductors 104 and 105. The transducer 103 is of conventional construction and is arranged to impart vibratory mechanical motion at a fixed ultrasonic frequency to a welding element or horn 107. The horn 107 is disposed in juxtaposition with one side of the belt material, while the opposite side rests on a stationary table 108.

The apparatus 100 is effective to join the ends of either a multi-sheet belt, such as the belt 50 (FIGURE 3) or a single sheet belt, such as the belt 90 (FIGURES 7 and 8). The ends of the belt to be joined are positioned in overlapping relationship with each other and are clamped on a movable fixture (not visible in FIGURE 8). The amount of overlap preferably is at least as great as the thickness of the belt and in the FIGURE 8 embodiment is slightly over twice the belt thickness. The belt is moved transversely along the table 108, and the vibratory motion of the horn 107 forms a permanent weld or seal 112 between the overlapping ends of the belt with little interruption in the smooth continuity of the belt surfaces. The weld 112 advantageously is formed after the belt has been arranged on the paper machine and around the various rolls which support it from the inside of its loop. However, under some circumstances the weld may be formed off the machine prior to installation, and the belt may be installed by sliding it over the temporarily unsupported ends of the inside rolls on the machine.

The sealing apparatus 100 also is advantageous in the formation of longitudinal ultrasonic seals, such as the seal 115 (FIGURE 3) between the two sheets 60 and 61 forming the belt 50. Particularly for these longitudinal seals, the belt may be held stationary, and the apparatus 100 moved to form the seal. In addition, the apparatus is advantageous in the formation of transverse or oblique seals between adjacent sheets, as in cases where the belt comprises successive side-by-side sheets which extend in the cross machine direction, for example.

Although the use of ultrasonic sealing apparatus is advantageous in the formation of supplemental belts in accordance with several embodiments of the invention, in other good arrangements the polymeric material is adhesively interconnected or is joined by lamination or other suitable techniques. As an illustration, in some cases a polyester tape of the type available commercially from the G. T. Schjeldahl Company, Northfield, Minn., may be used to unite the ends of a single sheet belt, for example, or to hold adjacent sheets of a multi-sheet belt in side-by-side relationship with each other.

Supplemental belts constructed in accordance with the various illustrated embodiments of the invention should have a thickness which is sufficient to provide the desired strength and durability characteristics without unduly restricting the belt's flexibility. In several advantageous embodiments, the thickness of the belts should range between about 10.0 mils and 42.0 mils for optimum operating characteristics, and preferably between about 14 mils and 28 mils when used with most types of Fourdrinier screens or wet felts. In other cases, patricularly for web carrying belts of widely varying design, good results are achieved with supplemental belt thicknesses outside this range.

The Mylar polyester film presently available customarily ranges in thickness from about 0.25 mil to about 14.0 mils for single ply construction. Accordingly, for machines in which the desired thickness of a Mylar belt is greater than 14.0 mils, the belt is of multi-ply construction. One such multi-ply belt 116 is shown in FIGURE 9. The belt 116 includes two sheets 117 and 118 which are laminated in facing relationship with each other to provide a unitary structure. A suitable adhesive 120, such as one of the polyurethane resins, for example, is used to secure the sheets 117 and 118 together. One polyurethane resin which is particularly useful for this purpose is Unithane Resin 390T, which is the trade name of the Thiokol Chemical Corporation, Trenton, N.J. The assembled belt includes a series of perforations 122 which preferably are formed after the sheets have been laminated together. These perforations are of a size and orientation similar to the perforations 63 (FIGURE 3) described heretofore.

In using supplemental belts with a web carrying belt on a paper machine, it often is desirable to provide adequate porosity in a lateral direction to permit the moisture from the web carrying belt to move in directions parallel to the surface of the supplemental belt and thereby escape through the perforations. For many types of web carrying belts, the pore volume of the belt itself is sufficient to provide the requisite lateral porosity. In situations in which additional pore volume is desired, however, the outer surface of the supplemental belt is modified to provide a series of horizontally extending channels leading between the perforations.

Figure 10:
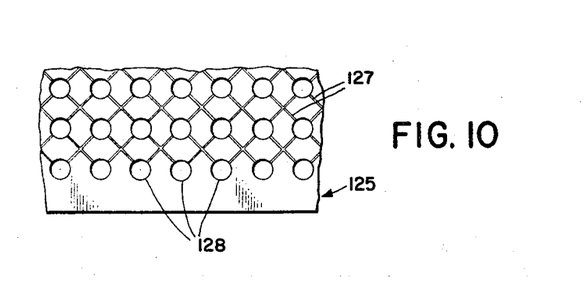
FIGURES 10–12 are fragmentary plan views showing portions of supplemental belts in accordance with still other embodiments of the invention.

As an illustration, in some cases the outer surface of the supplemental belt, such as the belt 125 shown in FIGURE 10, for example, is provided with scoring 127. The belt 125 includes perforations 128 of the type described above, and the scoring 127 extends diagonally between these perforations to form minute channels or grooves in the upper belt surface which serve to interconnect the adjacent diagonal perforations. As moisture from the wet paper web passes through the web carrying belt and contacts the upper surface of the supplemental belt, it runs along these grooves until reaching the perforations. The moisture then passes through the belt to one of the various de-watering devices therebeneath or to the atmosphere.

Figure 11:
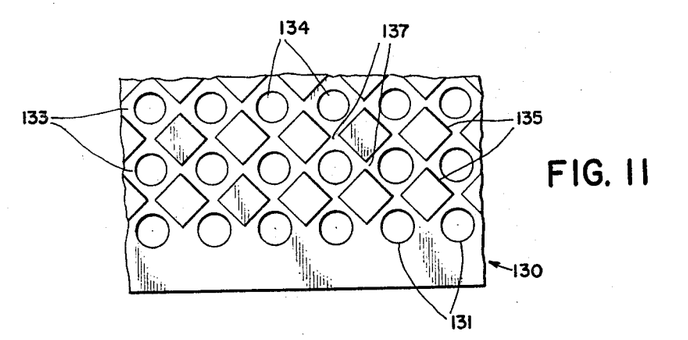
Figure 12:
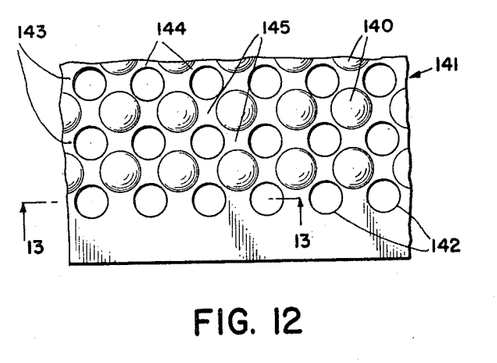
Figure 13:
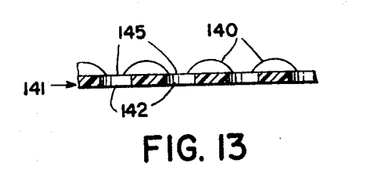
FIGURE 13 is a fragmentary vertical sectional view taken along the line 13—13 in FIGURE 12.

FIGURES 11–13 are illustrative of other modifications of the upper surfaces of supplemental belts to further enhance their moisture-removing characteristics. In FIGURE 11, there is shown a supplemental belt 130 having perforations 131 of a size and orientation similar to that described heretofore. These perforations are arranged in longitudinally extending rows 133 and transverse rows 134. Intermediate each rectangular group of four adjacent perforations, there is provided a protuberance 135 of generally diamond-shaped configuration. These protuberances illustratively are integrally formed with the belt, as by embossing, for example, and serve to define a series of channels 137 which are substantially coextensive with the rows 133 and 134. The channels 137 interconnect adjacent perforations in each row and greatly enhance the lateral flow of moisture along the upper belt surface to and through these perforations.

In some cases, the protuberances on the upper surface of the supplemental belt are in the form of small hemispheres, as shown by the protuberances 140 on the belt 141 of FIGURES 12 and 13. The belt 141 is provided with perforations 142 substantially entirely throughout its surface area which are arranged in longitudinal rows 143 and transverse rows 144. Each of the protuberances 140 illustratively is of a diameter slightly greater than that of the perforations 142 and is positioned intermediate each rectangular group of four adjacent perforations. The arrangement is such that a series of channels or paths 145 are provided between adjacent perforations in each row to facilitate the migration of moisture thereto.

In certain good embodiments, the protuberances 135 and 140 of the belts 130 and 141 shown in FIGURES 11–13 are oriented between the adjacent belt perforations in the longitudinal and transverse rows, rather than intermediate each rectangular group of four perforations. The channels defined by adjacent protuberances are in open communication with the perforations to facilitate drainage.

The modified outer surfaces of the supplemental belts 125, 130 and 141 of FIGURES 10–13 also provide improved frictional characteristics between the supplemental belt and the Fourdrinier screen or other web carrying belt. In some cases, the modified surfaces fulfill the function of the abrasive coating layer 75 (FIGURE 6). In other embodiments, both an abrasive coating and a modified surface are provided to enable the realization of extremely effective frictional and drainage properties on the outer surface of the supplemental belt.

Figure 14:
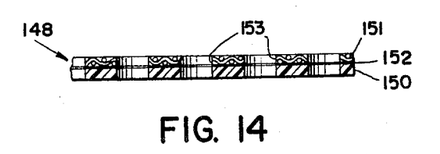
FIGURES 14–16 are fragmentary vertical sectional views in general similar to FIGURE 9 but showing supplemental belts in accordance with further embodiments of the invention.
Figure 15:
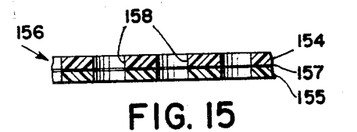
Figure 16:
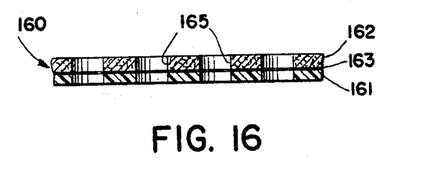
Figure 17:
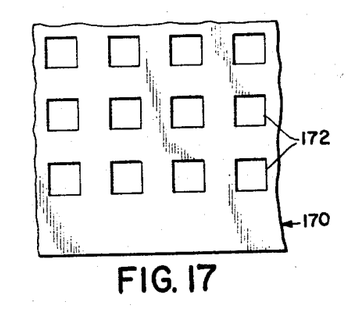
FIGURE 17 is a fragmentary plan view of a portion of a supplemental belt in accordance with still another embodiment of the invention.

Referring now to FIGURES 14–16, there are shown other forms of supplemental belts which are effective to improve the frictional resistance between the upper belt surface and the web carrying belt. FIGURE 14 is illustrative of a supplemental belt 148 which comprises a sheet 150 of Mylar polyester film laminated to a woven textile fabric 151. The fabric 151 is woven from either natural or synthetic fibers, such as nylon, for example, or from blends of natural and synthetic fibers, and is held in place by a suitable adhesive 152. The assembled structure is perforated in a manner similar to that described above to provide perforations 153.

In the embodiment of FIGURE 15, a layer 154 of open-cell plastic foam is laminated to a sheet 155 of Mylar polyester film to form a supplemental belt 156. The layer 154 preferably comprises a polyester or polyesterurethane resin, the polyesterurethane resins having exhibited particular utility in this regard. The layer 154 and the sheet 155 are held together by an adhesive 157 and are provided with perforations 158 of the type described above.

In other embodiments, a non-woven fibrous batt is applied to the outer surface of the supplemental belt to increase its frictional resistance. In FIGURE 16, there is shown a belt 160 which comprises a sheet 161 of Mylar polyester film laminated to a batt 162 of natural or synthetic fibers. In some cases, the batt is pre-formed, as by needling, felting, chemical bonding, etc., or other conventional process. Particularly in cases in which the fibers forming the batt are to be given a predetermined orientation to further enhance its drainage characteristics, however, the individual fibers are deposited electrostatically on the sheet 161. The batt is secured to the sheet by an adhesive 163, and the assembled belt is then punched to form perforations 165.

The laminated layers on the sheets forming the supplemental belts 148, 156 and 160 are of sufficiently open construction so as not to substantially impede the drainage of moisture therethrough. Because of the comparatively high coefficient of friction, these layers substantially eliminate the possibility of slippage between the supplemental belts and the web carrying belts.

The laminated belts 148, 156 and 160 are arranged on the paper machine in a manner similar to any of the various belts described heretofore. Thus, when used in the forming section the laminated belts may be trained around the couch roll, as shown in FIGURE 1, or around both the couch roll and the breast roll in the manner illustrated in FIGURE 4. The belts additionally may be used as idler belts as shown in FIGURE 5.

In cases in which the supplemental belts are used with a Fourdrinier screen or other forming medium and are arranged as shown in FIGURE 4, the supplemental belt 77, or any of the laminated belts 148, 156 or 160, is particularly advantageous in the reduction of "stock jump" as the fibrous suspension passes over the table rolls 43. In many prior paper machines, the Fourdrinier screen exhibited a tendency to wrap each of the table rolls, causing a disturbance of the suspension which affected adversely the formation of the web. This tendency was of special moment in high speed machines and was caused primarily because each table roll acted as a pump creating zones of increased and decreased pressure beneath the screen. By arranging the belt between the screen and the table rolls, however, the tendency of the screen to wrap the table rolls is markedly reduced, and the incidence of "stock jump" is substantially less than would otherwise be the case. This effect is further enhanced by the circulation of air through the perforations in the belt and in cases in which a laminated belt is employed, and the open-cell characteristics of the foam layer 154 (FIGURE 15), for example, also permit air to circulate freely in a generally lateral direction.

Figure 18:
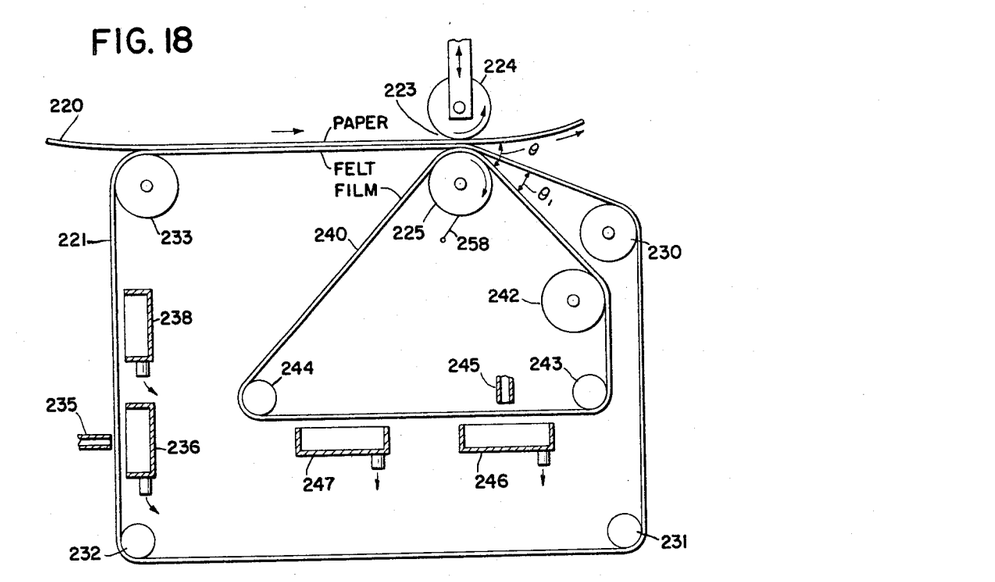
FIGURE 18 is a diagrammatic side elevational view of the press section of a papermaking machine including a supplemental belt in accordance with a still further embodiment of the invention, with certain parts shown in section.

As indicated heretofore, supplemental belts in accordance with the invention also may be advantageously employed in the press section of a paper machine. Referring to FIGURE 18, there is shown a moist paper web 220 which is supported by a papermakers' wet felt 221. In the embodiment of FIGURE 18, the wet felt 221 comprises a conventional woven felt of wood, synethetic or other suitable material. In some advantageous arrangements, however, a duplex felt or similar web transporting belt may be employed with good effect. One example of a duplex felt which is of particular utility in connection with the invention is disclosed in U.S. Patent 3,214,330 referred to above.

The wet felt 221 carries the moist paper web 220 from left to right, as viewed in FIGURE 18, through the nip 223 between a pair of cooperating press rolls 224 and 225. The rolls 224 and 225 are each in the form of a drum having an imperforate cylindrical surface and are of conventional construction. The uppermost roll 224 customarily is movable in a vertical direction to vary its spacing with respect to the lower or inside roll 225. This latter roll is driven in a clockwise direction (by means not shown) to advance the felt 221 and paper web 220 through the nip 223.

The wet felt 221 is woven in endless fashion and passes over a support roll 230 after advancing through the nip 223. The felt 221 is then trained around successive guide rolls 231 and 232 and an additional support roll 233. As the felt moves from the guide roll 232 to the support roll 233, it is contacted by a jet of compressed air from a conduit 235 in juxtaposition with its outer surface. A tray 236 is positioned adjacent the opposite or inner surface of the felt to receive moisture expelled by the air from the conduit 235. Additional moisture is removed by a suction box 238 disposed immediately above the tray 236.

The wet felt 221, the press rolls 224 and 225, and the additional rolls 230, 231, 232 and 233 are illustrative of a conventional combination of components in the press section of a paper machine. Frequently, the press section includes a plurality of wet felts, press rolls, etc., such that, by the time the paper web is advanced to the ensuing dryer section of the machine, its moisture content has been reduced from eighty or ninety percent, wet basis, to a point at which the web in many cases is substantially self-supporting. By percent moisture content "wet basis" is meant the weight of the water in the web divided by the total weight of a water saturated web times 100, as determined by the procedure described in ASTM Standards for Textile Materials, Tentative Methods for Quantitative Analysis of Textiles, ASTM designation D629–59T, pages 317–8, 31st ed., published November 1960. It will be readily apparent that large quantities of moisture are received by the felt 221 as it moves from the roll 233 and passes between the press rolls 224 and 225.

To enable the efficient removal of moisture as the felt 221 moves between the press rolls 224 and 225, there is provided a perforated supplemental film or belt 240 which is fabricated from Mylar polyester film or other polymeric material of the type described heretofore. The supplemental belt 240 is of endless construction and is arranged inside the endless path of the felt 221. The belt is trained through the nip 223 between the press rolls 224 and 225 with its inner surface in contact with the lowermost press roll 225 and its outer surface in contact with the lower surface of the felt. From the nip 223, the belt 240 extends in an angularly downward direction to a support roll 242 and then around two additional rolls 243 and 244. The relative positions of the press roll 225 and the roll 242 are such that the portion of the belt 240 therebetween forms a large acute angle $\theta$ with respect to the direction of travel of the paper web 220. The support roll 230 for the felt 221 is located with respect to these rolls such that the felt bisects the angle $\theta$ as it moves from the roll 225 to the roll 230, forming an acute angle $\theta_1$ with the belt.

The arrangement of the inside press roll 225, the support roll 242 and the roll 243 serves to minimize the possibility of discharging moisture from the supplemental belt 240 by centrifugal action and thus wetting the adjacent portion of the felt 221. As the belt 240 passes over the roll 242, its direction of travel is changed only slightly, the portion of the belt approaching roll 242 forming an obtuse angle with the portion leaving the roll. The change in direction of the belt as it moves past the roll 243 approximates a right angle. These changes in direction, together with the roll diameters, are arranged such that the centifugal forces tending to throw moisture from the belt are counter-balanced by the forces holding the moisture within the belt perforations.

As the inside belt 240 moves between the rolls 243 and 244, it is carried past a compressed air conduit 245 in spaced relationship with the inner surface of the belt. A tray 246 is arranged adjacent the conduit 245 in juxtaposition with the outer belt surface for receiving moisture from the belt. The belt then moves past a suction box 247 which serves to remove any remaining moisture.

Figure 19:
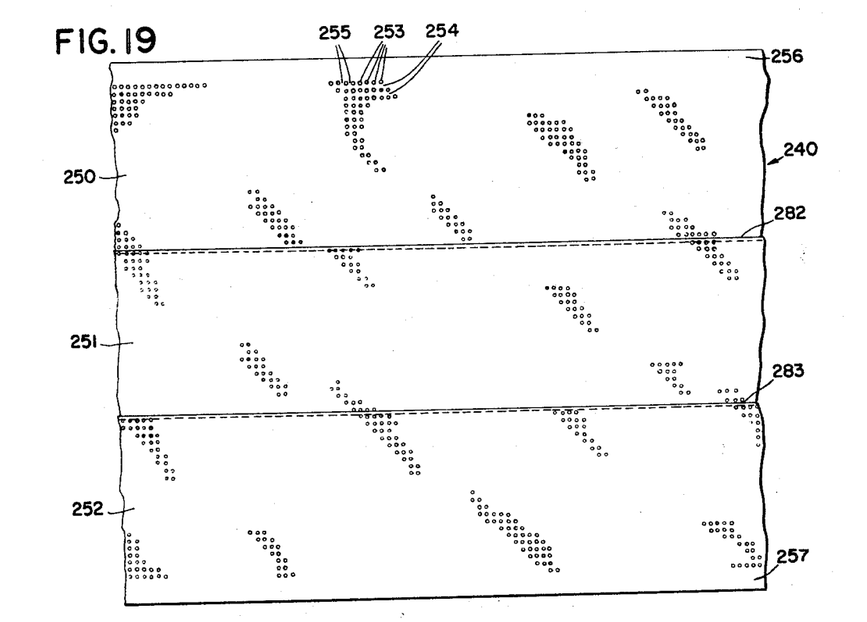
FIGURE 19 is an enlarged plan view of a portion of the supplemental belt shown in FIGURE 18.

As best shown in FIGURE 19, the belt 240 is fabricated from three oblong sheets 250, 251 and 252 of Mylar polyester film. These sheets are ultrasonically sealed in side-by-side relationship with each other, in a manner similar to that described heretofore with respect to the belt 50 of FIGURE 3, to provide smooth continuous belt surfaces. The belt 240 is provided with a plurality of perforations 253 substantially entirely throughout its surface area. The perforations 253 are aligned in rows which extend in the longitudinal or machine direction of the belt and also in the transverse or cross direction. The spacing between adjacent rows of perforations is substantially equal to the diameter of each perforation and provides uninterrupted longitudinal paths 254 and transverse paths 255 of the belt material.

The outermost sheets 250 and 252 of the belt 240 include imperforate, longitudinally extending areas 256 and 257, respectively. The areas 256 and 257 extend along the outer edges of their respective sheets and serve to minimize the possibility of fraying or rupture at these edges after repeated usage.

The inner press roll 225 is continuously rotated in a clockwise direction, as viewed in FIGURE 18, to similarly rotate the inside belt 240 and the wet felt 221, thus carrying the wet paper web 220 between the press rolls 224 and 225. As the web 220 enters the nip 223, large quantities of moisture are squeezed therefrom into the voids between the yarns of the felt 221. This moisture passes through the felt to the inside belt 240. A small quantity of the removed moisture is transmitted through the individual perforations 253 to the cylindrical surface of the press roll 225, where it is removed by a wiper or doctor blade 258 of conventional construction. The major portion of the moisture from the felt, however, is retained within the perforations 253 by capillary attraction. Although the centrifugal forces exerted on the retained moisture as the belt 240 leaves the nip 223 exhibit a tendency to throw the moisture from the belt, these forces are counter-balanced by a partial vacuum which is created as the path of the belt moves away from the surface of the roll 225. As a result, the capillary action of the moisture within the perforations 253 holds this moisture in place as the belt passes around the support roll 242 and the guide roll 243.

As the supplemental belt 240 approaches the conduit 245 and the adjacent tray 246, compressed air from the conduit forces the moisture out of the individual perforations 253 and into the tray, from which it is drained continuously. Any additional moisture in the belt 240 is removed as it moves past the suction box 247. Because of the unique characteristics of the polymeric belt material, at the time the belt moves around the guide roll 244 and again advances toward the nip 223, the belt has almost zero moisture content and is in condition to receive additional moisture from the wet felt 221. In addition, the belt material is such that relatively small amounts of compressed air and suction are needed to completely purge the perforations of any fibrous material, dirt, etc., that may have collected therein.

The size and orientation of the perforations 253 in the supplemental belt 240 are carefully controlled to enable the efficient transmission of moisture thereto from the felt 221 and to insure the retention of a maximum quantity of this moisture in the perforations by capillary attraction. Because of the desirability of removing a maximum amount of moisture from the felt 221, the perforations 253 preferably should be comparatively large. However, the diameter of the perforations is limited by the need for providing sufficient capillary attraction to retain the removed moisture as the belt moves around the rolls 242 and 243 to the tray 246. As discussed previously, the perforations in the supplemental belts in accordance with the invention preferably have an open area within the range of from about 10 percent to about 50 percent, with the perforations in the forming section belts lying in the upper portion of this range and advantageously being in excess of about .030 inch in diameter. For press section belts such as the supplemental belt 240, however, the perforations may be somewhat smaller and illustratively may have a diameter as low as about .015 inch. The maximum diameter of the perforations in the belts may vary widely depending upon the particular characteristics of the portion of the paper machine in which the belts are used. In several embodiments, however, the diameter of the perforations should not exceed about .075 inch in order to insure the retention of the removed moisture by capillary attraction as the belt is directed around its endless path.

It of course will be apparent from the foregoing discussion that one or both surfaces of supplemental press belts constructed in accordance with the invention may be modified to increase the belt's slippage resistance or improve its moisture removing characteristics in a manner similar to that of the various forming section belts described heretofore. Thus, the press belt 240 of FIGURES 18–20 may be provided with a layer of colloidal silica of the type shown by the layer 75 on the forming section belt 50 of FIGURE 6, for example. The belt 240 also may include channels and protuberances having a configuration similar to those shown in FIGURES 10–13 or may be laminated with a layer of a suitable woven textile fabric, a fibrous batt or an open-cell foam as illustrated in FIGURES 14–16. One illustration of a laminated press belt which exhibits particular advantages is shown in FIGURE 21. In this figure, a layer 210 of open-cell plastic foam is laminated to the outer surface of a sheet 211 of Mylar polyester film to form a supplemental belt 212. The layer 210 and the sheet 211 are held together by an adhesive 213 and are provided with perforations 214 of the type described above.

The laminated press belts are arranged in the press section of a paper machine in a manner similar to any of the various belts described heretofore. In each case, the belt is trained through the nip 223 (FIGURES 18 and 21) between the press rolls 224 and 225 and around the support roll 242 and the guide rolls 243 and 244 with the laminated layer 210 externally disposed in contact with the felt 221. The ends of the belt are then ultrasonically joined together to provide an endless construction. In most cases the ultrasonic sealing is accomplished with the laminated layer in place, although the layer 210, for example, may be foamed in place after the sealing operation. Alternatively, the ends of a given belt may be sealed off the machine and the laminated layer installed before positioning the belt around the various rolls.

The laminated belt 212 is particularly advantageous in reducing any rewetting of the web transporting felt as it emerges from the nip between the press rolls. As the belt is squeezed by the press rolls, the perforations in the laminated layer contract slightly, and the laminations serve as a barrier to prevent the moisture retained by the polyester sheet material from returning to the lower surface of the felt. Upon entering the nip 223 the wet felt 221 is compressed to express moisture from the voids in the felt material into the open-cell structure of the foam 210. Upon the compression of the foam, this moisture is driven into the individual perforations 214 in the sheet material 211, where it is held by capillary attraction in the manner described above. Thereafter, the layer of foam tends to block the return of the moisture in the perforations to the felt, and substantially all the retained moisture is carried around the rolls 242 and 243 (FIGURE 18) to the moisture removal devices 246 and 247.

In addition to its advantageous moisture-removal characteristics, the laminated belt 212 presents a comparatively rough outer surface to the wet felt as it moves between the press rolls, thus serving a function similar to that of the abrasive layer 75 (FIGURE 6) on the belt 50. With this arrangement, the possibility of slippage between the belt and the felt is substantially reduced.

In some embodiments, a laminated or otherwise modified belt is installed around the various rolls 225, 242, 243 and 244 in an inverted position, that is, with the modified surface in contact with the rolls and with the layer of polyester film in contact with the adjacent surface of the transporting felt. The modified surface produces a comparatively high coefficient of friction between the belt and the rolls and thus provides a smooth transmission of power from the driving roll to the transporting felt. In some cases, both surfaces of a given belt are modified to further enhance the smooth transmission of power from the driving roll to the felt.

Although the improved supplemental belts have been shown and described as having particular utility in combination with a Fourdrinier screen or a woven papermakers' felt, the invention in its broadest aspects is not restricted to such use. Thus, the supplemental belts also may be employed in combination with other types of porous transporting belts for the wet paper web. As an illustration, polyester sheet material may be used as the paper web transporter in addition to the use of such sheet material as a supplemental belt. Other types of transporting belts also may be employed with good effect.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. In a paper machine, in combination, a first belt arranged to move along an endless path for transporting a layer of papermaking material, a supplemental belt, and means for supporting said supplemental belt along an endless path inside the endless path of said first belt, said supplemental belt comprising a sheet of polymeric material which is substantially nondeformable in thickness, said sheet having inner and outer surfaces and including two ends and a plurality of spaced perforations substantially entirely throughout said sheet but with uninterrupted paths of the sheet material extending in a lengthwise direction, a layer of compressible material laminated to the outer surface of said sheet, and means on said sheet comprising a joint for joining the ends of said sheet.

2. A paper machine of the character set forth in claim 1, in which said layer of compressible material comprises a woven textile fabric.

3. A paper machine of the character set forth in claim 1, in which said layer of compressible material comprises an open-cell foam.

4. A paper machine of the character set forth in claim 1, in which said layer of compressible material comprises a nonwoven fibrous batt.

5. A paper machine of the character set forth in claim 1, in which the sheet of polymeric material comprises polyethylene terephthalate film.

6. In apparatus for removing moisture from a web of paper in the press section of a papermaking machine, in combination, a pair of cooperating press rolls, a porous endless belt for transporting the wet paper web through the nip between said press rolls, an oblong sheet of incompressible thermoplastic polymeric material having a portion interposed between said belt and one of said press rolls, said sheet including a plurality of spaced perforations substantially entirely throughout said sheet of a size and orientation sufficient to enable the efficient retention of moisture therein by capillary action, means on said sheet comprising a joint for joining the ends of said sheet, to form a supplemental belt, means for supporting said supplemental belt along an endless path inside the endless path of the web transporting belt, and a layer of open-cell foam laminated to the outer surface of said supplemental belt, said layer being in facing contact with the adjacent surface of said transporting belt as it passes through said nip.

7. A method of installing an endless supplemental belt of polymeric sheet material on a papermaking machine, said machine having a number of elements both within and without the loop of said endless belt, said method comprising placing a sheet of substantially nondeformable polymeric material joinable by ultrasonic techniques generally along the run of said belt with portions of said sheet lying between the elements of the machine in the same manner as the installed belt is to lie, said sheet having a plurality of spaced perforations substantially entirely throughout the same, placing the ends of said sheet in edge to edge adjoining relationship, and thereafter ultrasonically joining the ends of said sheet to form in place on the machine a continuous endless supplemental belt.

8. The method of claim 7, in which the sheet of polymeric material comprises polyethylene terephthalate film.

9. A method of installing an endless looped belt of polymeric sheet material on a papermaking machine, said machine having a number of elements both within and without the loop of said endless belt, said method comprising placing a plurality of sheets of polymeric material generally along the run of said belt with portions of said sheets lying between the elements of the machine in the same manner as the installed belt is to lie, each of said sheets having at least one dimension less than the corresponding dimension of the installed belt and having a plurality of spaced perforations substantially entirely throughout the same, placing said sheets in edge to edge adjoining relationship, and ultrasonically joining the edges of said sheets to form in place on the machine a continuous endless looped belt.

References Cited

UNITED STATES PATENTS

| 1,514,011 | 11/1924 | Pope | 162—349 |
|---|---|---|---|
| 1,536,533 | 5/1925 | Sheehan | 162—358 |
| 3,022,814 | 2/1962 | Bodine | 156—73 |
| 3,121,660 | 2/1964 | Hall | 162 |
| 3,146,141 | 8/1964 | Woodland | 156—73 |

FOREIGN PATENTS

| 1,198,432 | 6/1959 | France. |
|---|---|---|
| 3,572 | 1880 | Great Britain. |

S. LEON BASHORE, *Primary Examiner.*

UNITED STATES PATENT OFFICE
CERTIFICATE OF CORRECTION

Patent No. 3,399,111                      August 27, 1968

Ralph H. Beaumont et al.

It is certified that error appears in the above identified patent and that said Letters Patent are hereby corrected as shown below:

Column 6, line 51, after "the" insert -- roll --. Column 7, line 7, "jointing" should read -- joining --; lines 11 and 13, "Tyle", each occurrence, should read -- Type --; line 17, "unussually" should read -- unusually --. Column 8, line 49, "with" should read -- which --. Column 10, line 39, "belt" should read -- screen 20 --. Column 14, line 3, "wood" should read -- wool --; same line 3, "synethetic" should read -- synthetic --.

Signed and sealed this 10th day of March 1970.

(SEAL)
Attest:

Edward M. Fletcher, Jr.                      WILLIAM E. SCHUYLER, JR.
Attesting Officer                                Commissioner of Patents